(12) United States Patent
Rang et al.

(10) Patent No.: US 6,260,682 B1
(45) Date of Patent: Jul. 17, 2001

(54) POWER TAKE-OFF UNIT HAVING TWO-PIECE OUTPUT GEAR ASSEMBLY

(75) Inventors: Brian L. Rang, Olive Branch, MS (US); Kudlip Raina, Collierville, TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/450,410

(22) Filed: Nov. 29, 1999

(51) Int. Cl.[7] .............................. F16D 13/52; F16H 37/00; F16H 55/17
(52) U.S. Cl. ...................... 192/70.19; 74/15.86; 74/431
(58) Field of Search .................... 192/70.19, 70.2, 192/85 AA; 74/432, 431, 11, 15.86

(56) References Cited

U.S. PATENT DOCUMENTS

| | | |
|---|---|---|
| 2,056,050 | 9/1936 | Harris . |
| 2,519,279 | 8/1950 | Peterson et al. . |
| 2,600,108 | 6/1952 | Gerst . |
| 2,736,202 | 2/1956 | Wagner . |
| 3,011,608 | * 12/1961 | Hansen ............................ 192/85 CA |
| 4,378,867 | * 4/1983 | Pasqualucci ................. 192/70.19 X |
| 4,542,801 | * 9/1985 | Richards et al. ................ 74/15.86 X |
| 4,597,301 | 7/1986 | Weis . |
| 4,773,277 | 9/1988 | Cook et al. . |
| 4,846,009 | * 7/1989 | Paluska ................................. 74/331 |
| 5,024,287 | 6/1991 | Okui et al. . |
| 5,322,148 | * 6/1994 | Fernandez ..................... 192/70.19 X |
| 5,363,714 | * 11/1994 | Hoguchi ................................. 74/432 |
| 5,542,306 | 8/1996 | Fernadez . |

FOREIGN PATENT DOCUMENTS 38 06 974 * 9/1988 (DE) ............................. 192/85 AA

* cited by examiner

*Primary Examiner*—Rodney H. Bonck
(74) *Attorney, Agent, or Firm*—MacMillan, Sobanski & Todd, LLC (57) ABSTRACT

A power take-off unit includes a rigid housing having an input gear rotatably supported therein. An output gear assembly is rotatably supported within the housing. The output gear assembly includes a toothed gear member and a bell member that are splined together. The toothed gear member meshes with the input gear such that it and the bell member are rotatably driven thereby. The bell member is selectively connected through the clutch assembly to an output shaft that is rotatably supported on the power take-off housing. The output shaft extends outwardly from the housing of the power take-off unit and is adapted to be connected to a rotatably driven accessory. The two-piece structure of the output gear assembly minimizes the cost and expense of manufacture and inventory and is more readily adaptable for varying the overall speed reduction gear ratio of the power take-off unit as desired.

8 Claims, 5 Drawing Sheets

POWER TAKE-OFF UNIT HAVING TWO-PIECE OUTPUT GEAR ASSEMBLY

BACKGROUND OF THE INVENTION

This invention relates in general to power take-off units for selectively providing power to a rotatably driven accessory provided on an engine driven vehicle. More specifically, this invention relates to a two-piece output bell gear assembly for use in a clutch assembly provided within such a power take-off unit.

Power take-off units are well known mechanical devices that are commonly used in conjunction with sources of rotational energy, such as vehicle engines and transmissions, for selectively providing power to one or more rotatably driving driven accessories. For example, power take-off units are commonly used in a variety of industrial and agricultural vehicles for operating hydraulic pumps that, in turn, operate hydraulically driven accessories, such as plows, trash compactors, lifting mechanisms, winches, and the like. The power take-off unit provides a relatively simple and inexpensive mechanism for supplying rotational power from the vehicle engine to operate the rotatably driven accessory.

To accomplish this, a typical power take-off unit includes a rigid housing having a mounting surface formed thereon. An opening is formed through a portion of the mounting surface of the power take-off housing. An input gear is rotatably supported within the housing and includes a portion that extends outwardly through the opening formed through the mounting surface. The mounting surface of the power take-off unit housing is adapted to be secured (typically by a plurality of bolts) to a corresponding mounting surface formed on a case of a transmission provided on the vehicle. An opening is also formed through a portion of the mounting surface of the transmission case. When the power take-off unit housing is secured to the transmission case, the input gear extends through the opening formed through the transmission case into meshing engagement with one of the transmission gears, typically a transmission gear that is driven by the vehicle engine. As a result, the input gear of the power take-of unit is rotatably driven whenever the vehicle engine is operated.

The power take-off unit typically further includes an output gear that is rotatably supported within the housing. The output gear meshes with the input gear such that the output gear is rotatably driven by the input gear whenever the vehicle engine is operated. The output gear is, in turn, connected to an output shaft that is rotatably supported on the power take-off housing. The output shaft extends outwardly from the housing of the power take-off unit and is adapted to be connected to the rotatably driven accessory. In some instances, the output gear is directly connected to the output shaft. In those instances, the output shaft is rotatably driven by the output gear whenever the vehicle engine is operated. In other instances, however, the output gear is connected through a clutch assembly to the output shaft. The clutch assembly is provided within the power take-off housing for selectively connecting the output gear to the output shaft and, therefore, permitting selective or intermittent operation of the rotatably driven accessory whenever the vehicle engine is operated.

In those power take-off units having a clutch assembly, the output gear is typically embodied as a bell gear including a gear portion and a bell portion. The gear portion of the output bell gear has a plurality of teeth formed thereon that mesh with corresponding teeth formed on the input gear. The bell portion of the output bell gear is generally hollow and cylindrical in shape and extends axially from the gear portion. The bell portion has a plurality of slots or similar structures that are adapted to engage corresponding protrusions or similar structures formed on a first plurality of clutch plates. In this manner, the first plurality of clutch plates is connected to the output gear for rotation therewith. A second plurality of clutch plates is splined onto the output shaft for rotation therewith. The second plurality of clutch plates are axially interleaved with the first plurality of clutch plates. An actuator is provided for selectively applying an axial force against the interleaved first and second pluralities of clutch plates. When such an axial force is applied, the first and second pluralities of clutch plates frictionally engage one another such that the output shaft is rotatably driven by the output bell gear. When such an axial force is not applied, the first and second pluralities of clutch plates do not frictionally engage one another, and the output shaft is not rotatably driven by the output bell gear.

In the past, the output bell gear has been formed from a single integral piece of material. Thus, the gear portion and the bell portion of the output bell gear have been formed as a single, unitary member. Although this structure has been effective, it has been found to be somewhat complicated in structure. As a result, traditional output bell gears are relatively difficult and expensive to manufacture. Also, as mentioned above, power take-off units are used to operate a wide variety of rotatably driven accessories. The nominal operating speeds of such rotatably driven accessories vary widely as well. To accommodate these different operating speeds for the rotatably driven accessories, it is known to construct power take-off units having differing overall speed reduction gear ratios between the input gear and the output shaft. The speed reduction gear ratio of power take-off units having the general structure described above is usually determined by the relative sizes of the input gear and the output bell gear. Thus, it is known to provide a plurality of differently sized output bell gears and to select a desired one of the plurality of output bell gears for use with the input gear in a given power take-off unit. In this manner, the speed reduction gear ratio of power take-off unit can be varied as desired. Unfortunately, it is costly and inefficient to manufacture such a large number of differently sized output bell gears and to maintain such output gears in inventory, particularly when the structures of such output bell gears are relatively complicated and expensive, as mentioned above. Thus, it would be desirable to provide an improved structure for a bell gear for use in a clutch assembly provided within a power take-off unit that minimizes the cost and expense of manufacture and inventory and that is more readily adaptable for varying the overall speed reduction gear ratio of the power take-off unit as desired.

SUMMARY OF THE INVENTION

This invention relates to an improved structure for a bell gear for use in a clutch assembly provided within a power take-off unit. The power take-off unit includes a rigid housing having an input gear rotatably supported therein. An output gear assembly is rotatably supported within the housing. The output gear assembly includes a toothed gear member and a bell member that are splined together. The toothed gear member meshes with the input gear such that it and the bell member are rotatably driven thereby. The bell member is selectively connected through the clutch assembly to an output shaft that is rotatably supported on the power take-off housing. The output shaft extends outwardly from the housing of the power take-off unit and is adapted to be connected to a rotatably driven accessory. The two-piece structure of the output gear assembly minimizes the cost and expense of manufacture and inventory and is more readily adaptable for varying the overall speed reduction gear ratio of the power take-off unit as desired.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
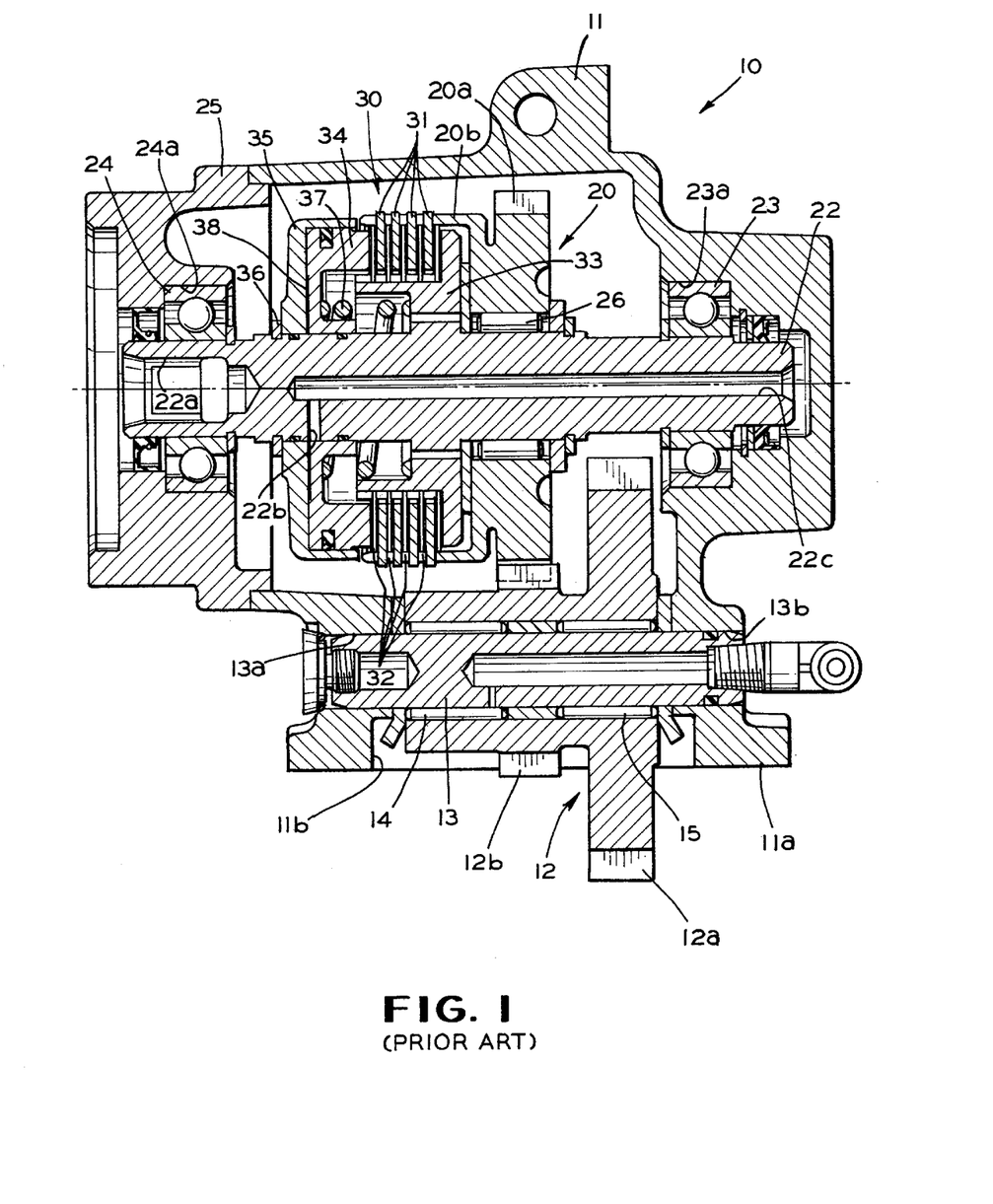
FIG. 1 is a sectional elevational view of a power take-off unit including an output bell gear that is conventional in the art.

Referring now to the drawings, there is illustrated in FIG. 1 a power take-off unit, indicated generally at 10, that is conventional in the art. The conventional power take-off unit 10 includes a rigid hollow housing 11 having a mounting surface 11a formed thereon. An opening 11b is formed through the mounting surface 11a for a purpose that will be described below. An input gear 12 is rotatably supported in the housing 11 of the power take-off unit 10. To accomplish this, an input shaft 13 is journaled in a pair of aligned openings 13a and 13b formed through the housing 11 of the power take-off unit 10. Thus, the input shaft 13 is stationary relative to the power take-off unit housing 11. The input gear 12 is rotatably supported on the input shaft 13 by a pair of bearings 14 and 15.

The input gear 12 has a first toothed gear portion 12a and a second toothed gear portion 12b formed thereon. The first toothed gear portion 12a is relatively large in diameter. As shown in FIG. 1, a portion of the first toothed gear portion 12a extends through the opening 11b formed through the mounting surface 11a of the power take-off housing 11. Thus, when the power take-off unit 10 is mounted on a vehicle transmission (not shown) or other source of rotational power in the manner described above, the first toothed gear portion 12a of the input gear 12 extends through the opening 11b into meshing engagement with one of the transmission gears, typically a transmission gear that is rotatably driven whenever the vehicle engine is operated. As a result, the input gear 11 of the power take-of unit 10 is rotatably driven whenever the vehicle engine is operated.

The power take-off unit 10 further includes an output gear, indicated generally at 20, that is rotatably driven by the input gear 12. The structure of the output gear 20 is more clearly illustrated in FIG. 2. As shown therein, the output gear 20 is formed from a single, integral piece of material, including a toothed gear portion 20a and a bell portion 20b. The toothed gear portion 20a of the output gear 20 meshes with the second toothed gear portion 12b of the input gear 12. Thus, the output gear 20 is rotatably driven by the input gear 12 whenever the vehicle engine is operated. The bell portion 20b of the output gear 20 is generally hollow and cylindrical in shape and extends axially from the toothed gear portion 20a. The bell portion 20b has a plurality of slots 21 formed therein for a purpose that will be explained below.

Figure 2:
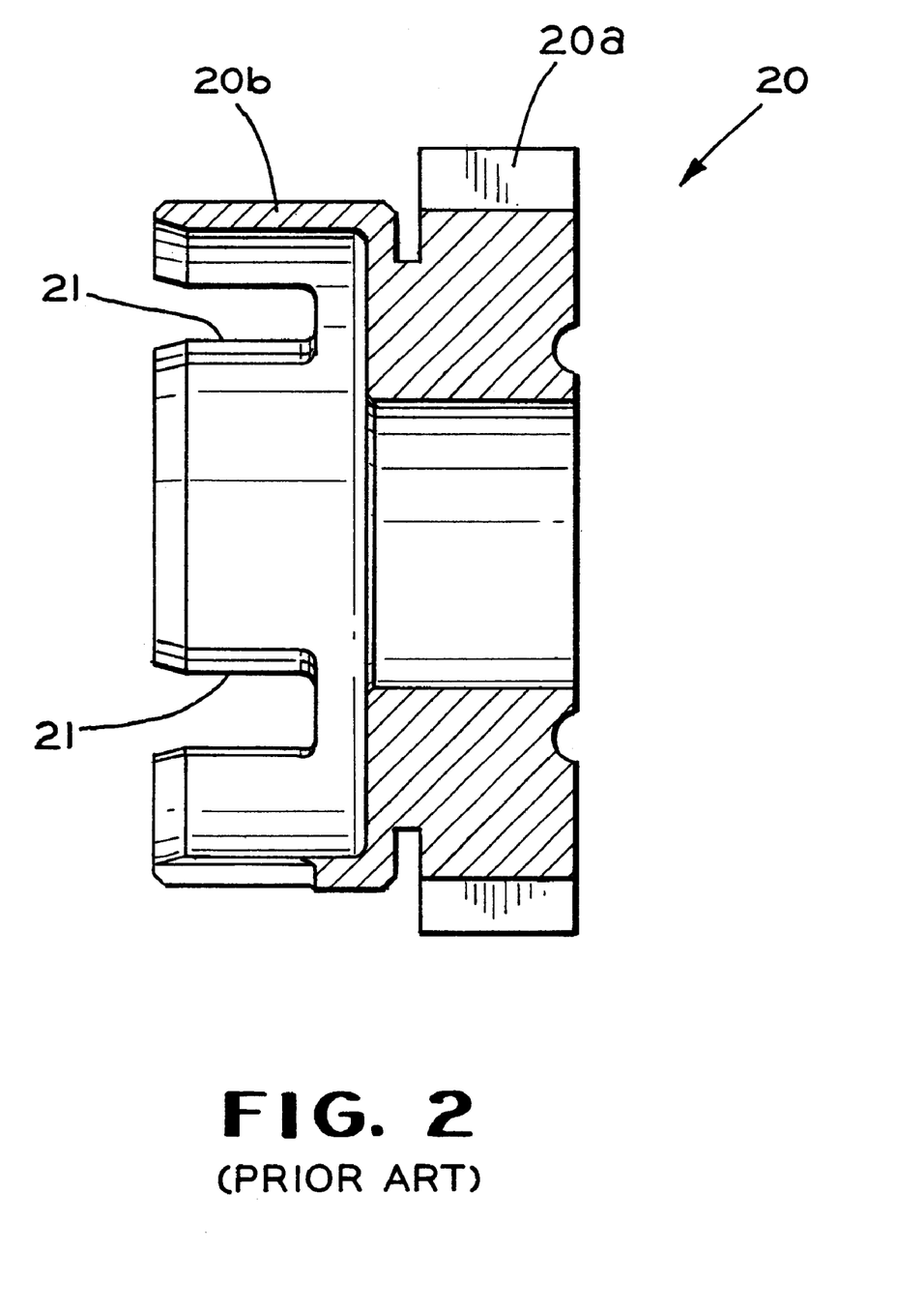
FIG. 2 is an enlarged sectional elevational view of the output bell gear illustrated in FIG. 1.

The output gear 20 is rotatably supported in the housing 11 of the power take-off unit 10. To accomplish this, an output shaft 22 is rotatably supported in a pair of aligned bearings 23 and 24. The bearing 23 is journaled in a recess 23a formed in the interior of the housing 11 of the power take-off unit 10. The bearing 24 is journaled in a recess 24a formed in a bearing cap 25 secured to the housing 11 of the power take-off unit 10. Thus, the output shaft 22 is rotatably supported in the housing 11 of the power take-off unit 10. The output gear 20 is rotatably supported on the output shaft 22 by a bearing 26. The end of the output shaft 22 rotatably supported by the bearing 24 has an internal spline 22a, a key, or other similar structure formed therein to facilitate the connection thereof to a rotatably driven accessory (not shown).

The power take-off unit 10 also includes a clutch assembly, indicated generally at 30, for selectively providing a driving connection between the bell portion 20b of the output gear 20 and the output shaft 22. The clutch assembly 30 includes a first plurality of flat, annular clutch plates 31 that are connected to the bell portion 20b of the output gear 20 for rotation therewith. To accomplish this, each of the first plurality of clutch plates 31 has one or more radially outwardly extending protrusions formed thereon. The protrusions of the clutch plates 31 are received in the slots 21 formed in the bell portion 20b of the output gear 20 for rotation therewith. Thus, the first plurality of clutch plates 31 are rotatably driven by the output gear 20 whenever the vehicle engine is operated. The clutch assembly 30 further includes a second plurality of flat, annular clutch plates 32. The second plurality of clutch plates 32 is disposed in alternating fashion between the first plurality of clutch plates 31. The second plurality of clutch plates 32 are splined to a clutch gear 33 that, in turn, is splined onto the output shaft 22. Thus, the second plurality of clutch plates 32, the clutch gear 33, and the output shaft 22 are connected for rotation together as a unit. The clutch gear 33 is restrained from axial movement in one direction (toward the right when viewing FIG. 1) by abutment with the toothed gear portion 20a of the output gear 20.

The clutch assembly 30 further includes an annular clutch piston 34 that is disposed within a hollow cylindrical clutch cylinder 35. The clutch cylinder 35 has a closed end and an opened end. One end of the clutch piston 34 (the left end when viewing FIG. 1) is disposed within the clutch cylinder 35, while the opposite end of the clutch piston 34 (the right end when viewing FIG. 1) extends from the opened end of the clutch cylinder 35 adjacent to the first and second pluralities of clutch plates 31 and 32. Both the clutch piston 34 and the clutch cylinder 35 are supported on the output shaft 22. The clutch piston 34 is axially movable along the output shaft 34, but the clutch cylinder 35 is restrained from axial movement in one direction (toward the left when viewing FIG. 1) by one or more retaining rings 36 mounted on the output shaft 22. A coiled clutch spring 37 reacts between the clutch piston 34 and the clutch gear 33. As discussed above, the clutch gear 33 is restrained from axial movement in one direction (toward the right when viewing FIG. 1) by the toothed gear portion 20a of the output gear 20. Thus, the clutch spring 37 urges the clutch piston 34 axially in the opposite direction (toward the left when viewing FIG. 1) toward a disengaged position adjacent to the closed end of the clutch cylinder 35. In the disengaged position, the clutch piston 34 does not engage the first and second pluralities of clutch plates 31 and 32. Thus, the clutch plates 31 and 32 do not frictionally engage one another. As a result, the clutch gear 33 is disconnected from the output gear 20 so as to provide no rotatable driving connection therebetween. In this condition, the output shaft 22 is not rotatably driven by the output gear 20.

An annular clutch chamber 38 is defined between the clutch piston 34 and the closed end of the clutch cylinder 35. This annular clutch chamber 38 communicates through a first transverse passageway 22b and an axial passageway 22c formed through the output shaft 22 with a source of pressurized fluid (not shown). As is well known, when pressurized fluid is provided from the source to the annular clutch chamber 38, the clutch piston 34 is moved axially against the urging of the clutch spring 37 from the disengaged position to an engaged position. In the engaged position, the clutch piston 34 compresses the first and second pluralities of clutch plates 31 and 32 together into frictional engagement. As a result, the clutch gear 33 is connected to the output gear 20 so as to provide a rotatable driving connection therebetween. In this condition, the output shaft 22 is rotatably driven by the output gear 20.

Figure 3:
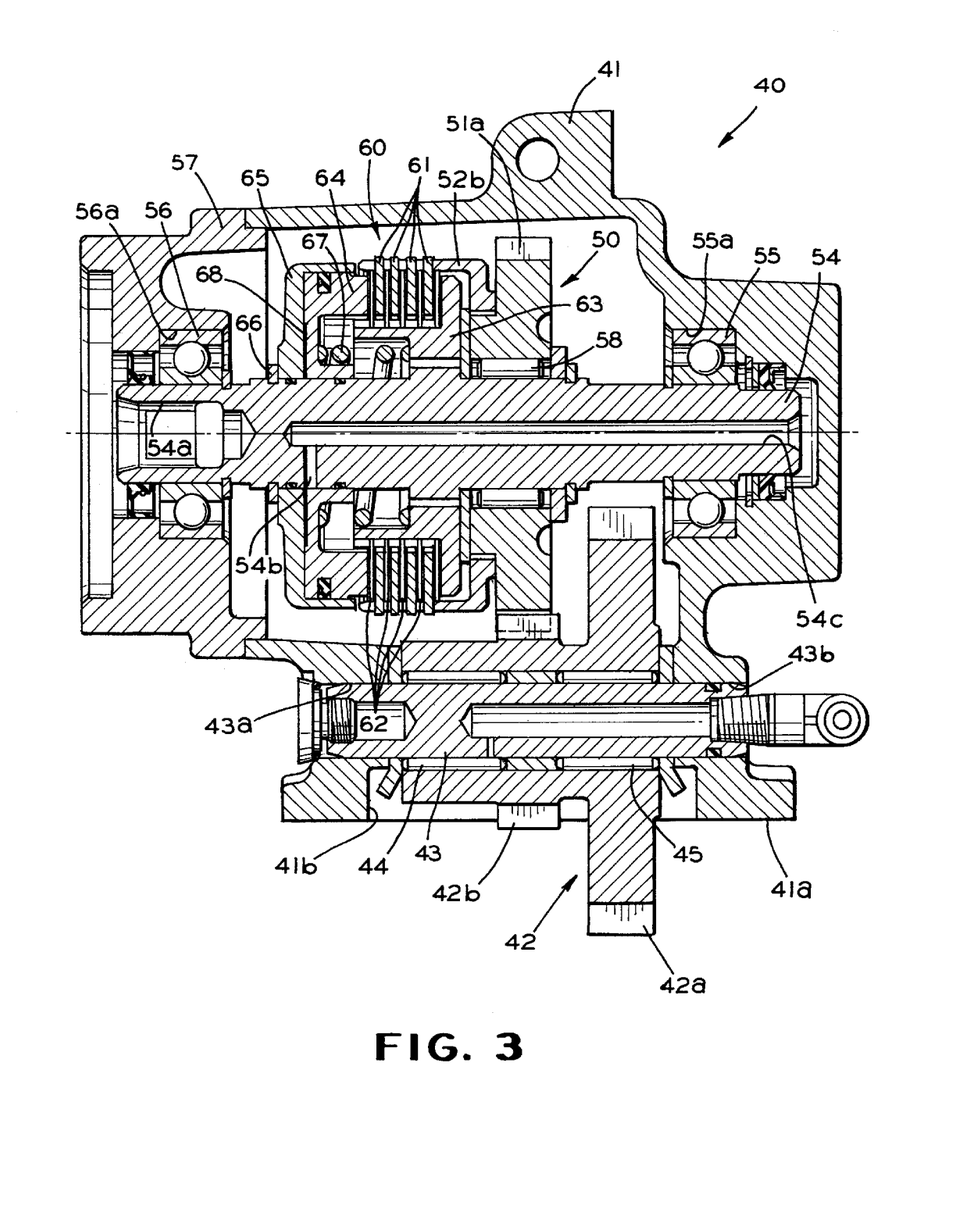
FIG. 3 is a sectional elevational view of a power take-off unit including a two-piece output bell gear assembly in accordance with this invention.

Referring now to FIG. 3, there is illustrated an improved structure for a power take-off unit, indicated generally at 40, in accordance with this invention. The power take-off unit 40 includes a rigid hollow housing 41 having a mounting surface 41a formed thereon. An opening 41b is formed through the mounting surface 41a for a purpose that will be described below. An input gear, indicated generally at 42, is rotatably supported in the housing 41 of the power take-off unit 40. To accomplish this, an input shaft 43 is journaled in a pair of aligned openings 43a and 43b formed through the housing 41 of the power take-off unit 40. Thus, the input shaft 43 is stationary relative to the power take-off unit housing 41. The input gear 42 is rotatably supported on the input shaft 43 by a pair of bearings 44 and 45.

The input gear 42 has a first toothed gear portion 42a and a second toothed gear portion 42b formed thereon. The first toothed gear portion 42a is relatively large in diameter. As shown in FIG. 3, a portion of the first toothed gear portion 42a extends through the opening 41b formed through the mounting surface 41a of the power take-off housing 41. Thus, when the power take-off unit 40 is mounted on a vehicle transmission (not shown) or other source of rotational power in the manner described above, the first toothed gear portion 42a of the input gear 42 extends through the opening 41b into meshing engagement with one of the transmission gears, typically a transmission gear that is rotatably driven whenever the vehicle engine is operated. As a result, the input gear 41 of the power take-of unit 40 is rotatably driven whenever the vehicle engine is operated.

The power take-off unit 40 further includes an output gear assembly, indicated generally at 50, that is rotatably driven by the input gear 42. The structure of the output gear assembly 50 is more clearly illustrated in FIGS. 4 and 5. As shown therein, the output gear assembly 50 is formed from two separate pieces of material, including a toothed gear member, indicated generally at 51, and a bell member, indicated generally at 52. The toothed gear member 51 of the output gear assembly 50 includes a toothed portion 51a that meshes with the second toothed gear portion 42b of the input gear 42. Thus, the toothed gear member 51 is rotatably driven by the input gear 42 whenever the vehicle engine is operated. The toothed gear member 51 further includes a male splined portion 51b. The bell member 52 of the output gear assembly 50 includes a female splined portion 52a that is sized and shaped to cooperate with the male splined portion 51b of the toothed gear member 51. Thus, the bell member 52 of the output gear assembly 50 is rotatably driven by the toothed gear member 51 whenever the vehicle engine is operated. The bell member 52 further includes a hollow and cylindrical portion 52b that extends axially from the female splined portion 52a. The hollow cylindrical portion 52b of the bell member 52 has a plurality of slots 53 formed therein for a purpose that will be explained below.

Figure 4:
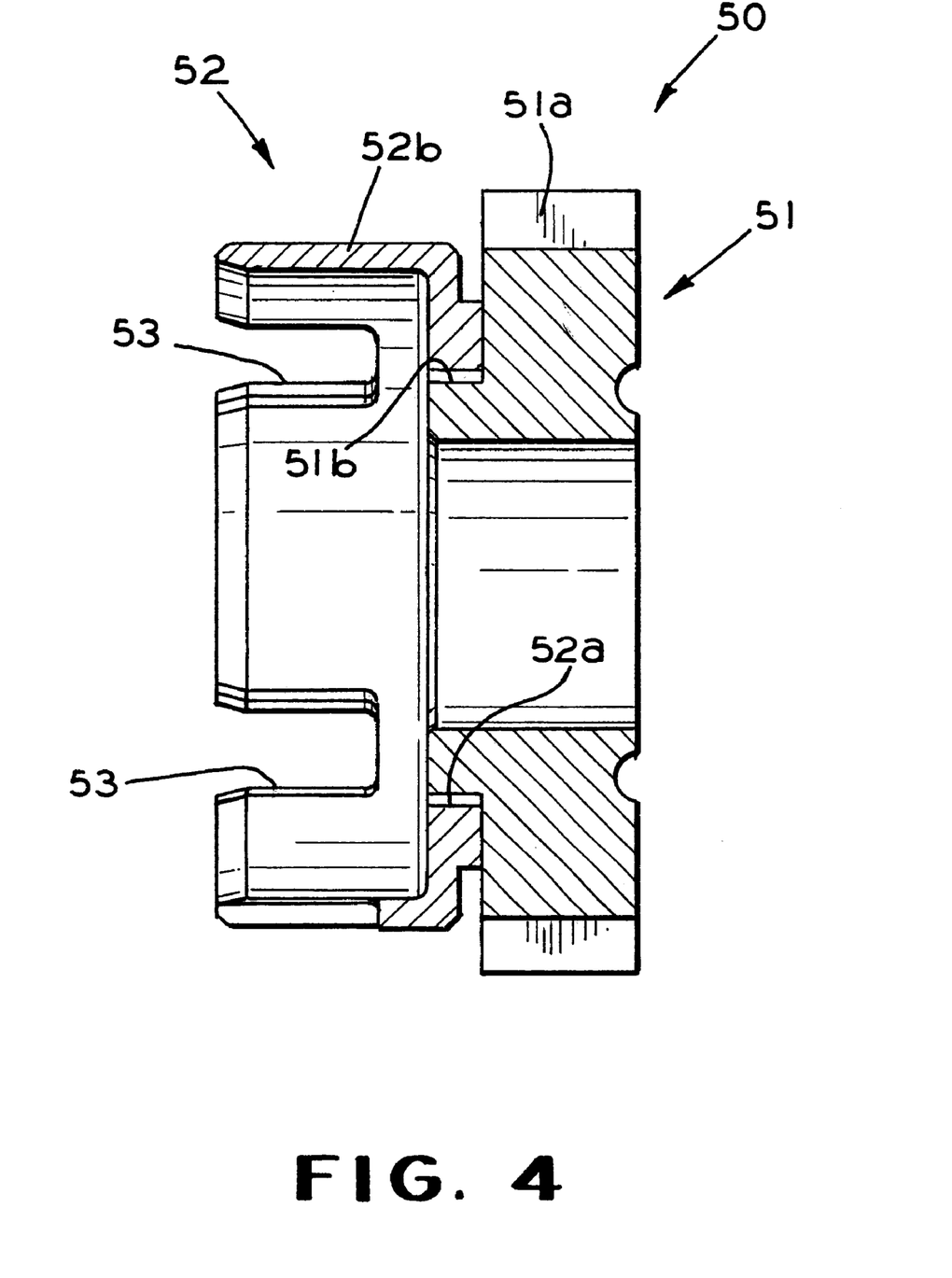
FIG. 4 is an enlarged sectional elevational view of the output bell gear assembly illustrated in FIG. 3.
Figure 5:
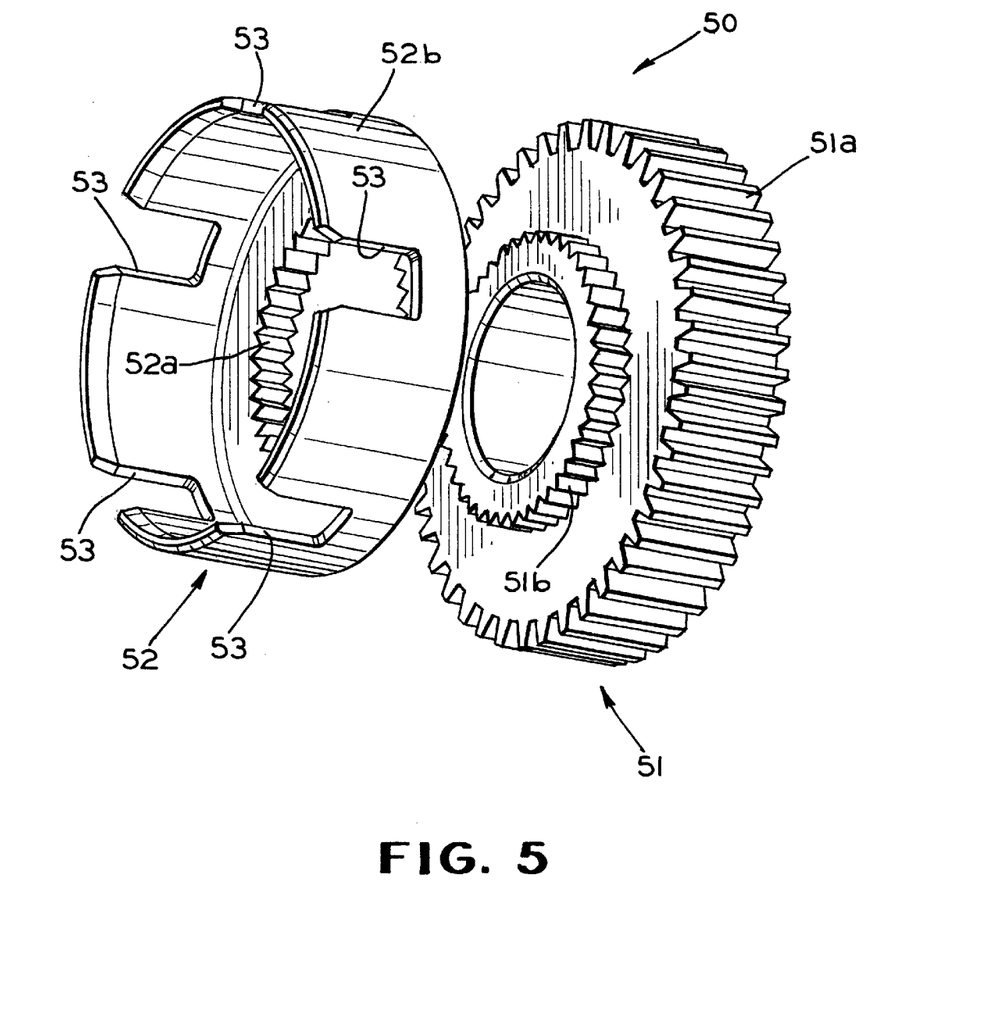
FIG. 5 is an exploded perspective view of the output bell gear assembly illustrated in FIGS. 3 and 4.

The output gear assembly 50 is rotatably supported in the housing 41 of the power take-off unit 40. To accomplish this, an output shaft 54 is rotatably supported in a pair of aligned bearings 55 and 56. The bearing 55 is journaled in a recess 55a formed in the interior of the housing 41 of the power take-off unit 50. The bearing 56 is journaled in a recess 56a formed in a bearing cap 57 secured to the housing 41 of the power take-off unit 40. Thus, the output shaft 54 is rotatably supported in the housing 41 of the power take-off unit 40. The output gear 50 is rotatably supported on the output shaft 54 by a bearing 58. The end of the output shaft 54 rotatably supported by the bearing 56 has an internal spline 54a, a key, or other similar structure formed therein to facilitate the connection thereof to a rotatably driven accessory (not shown).

The power take-off unit 40 also includes a clutch assembly, indicated generally at 60, for selectively providing a driving connection between the bell member 52 of the output gear assembly 50 and the output shaft 54. The clutch assembly 60 includes a first plurality of flat, annular clutch plates 61 that are connected to the hollow cylindrical portion 52b of the bell member 52 of the output gear assembly 50 for rotation therewith. To accomplish this, each of the first plurality of clutch plates 61 has one or more radially outwardly extending protrusions formed thereon. The protrusions of the clutch plates 61 are received in the slots 53 formed in the hollow cylindrical portion 52b of the bell member 52 of the output gear assembly 50 for rotation therewith. Thus, the first plurality of clutch plates 61 are rotatably driven by the output gear assembly 50 whenever the vehicle engine is operated. The clutch assembly 60 further includes a second plurality of flat, annular clutch plates 62. The second plurality of clutch plates 62 is disposed in alternating fashion between the first plurality of clutch plates 61. The second plurality of clutch plates 62 are splined to a clutch gear 63 that, in turn, is splined onto the output shaft 54. Thus, the second plurality of clutch plates 62, the clutch gear 63, and the output shaft 54 are connected for rotation together as a unit. The clutch gear 63 is restrained from axial movement in one direction (toward the right when viewing FIG. 3) by abutment with the toothed gear member 51 of the output gear assembly 50.

The clutch assembly 60 further includes an annular clutch piston 64 that is disposed within a hollow cylindrical clutch cylinder 65. The clutch cylinder 65 has a closed end and an opened end. One end of the clutch piston 64 (the left end when viewing FIG. 3) is disposed within the clutch cylinder 65, while the opposite end of the clutch piston 34 (the right end when viewing FIG. 1) extends from the opened end of the clutch cylinder 65 adjacent to the first and second pluralities of clutch plates 61 and 62. Both the clutch piston 64 and the clutch cylinder 65 are supported on the output shaft 54. The clutch piston 64 is axially movable along the output shaft 54, but the clutch cylinder 65 is restrained from axial movement in one direction (toward the left when viewing FIG. 3) by one or more retaining rings 66 mounted on the output shaft 54. A coiled clutch spring 67 reacts between the clutch piston 64 and the clutch gear 63. As discussed above, the clutch gear 63 is restrained from axial movement in one direction (toward the right when viewing FIG. 3) by the toothed gear member 51 of the output gear assembly 50. Thus, the clutch spring 67 urges the clutch piston 64 axially in the opposite direction (toward the left when viewing FIG. 3) toward a disengaged position adjacent to the closed end of the clutch cylinder 65. In the disengaged position, the clutch piston 64 does not engage the first and second pluralities of clutch plates 61 and 62. Thus, the clutch plates 61 and 62 do not frictionally engage one another. As a result, the clutch gear 63 is disconnected from the output gear assembly 50 so as to provide no rotatable driving connection therebetween. In this condition, the output shaft 54 is not rotatably driven by the output gear assembly 50.

An annular clutch chamber 68 is defined between the clutch piston 64 and the closed end of the clutch cylinder 65. This annular clutch chamber 68 communicates through a first transverse passageway 54b and an axial passageway 54c formed through the output shaft 54 with a source of pressurized fluid (not shown). As is well known, when pressurized fluid is provided from the source to the annular clutch chamber 68, the clutch piston 64 is moved axially against the urging of the clutch spring 67 from the disengaged position to an engaged position. In the engaged position, the clutch piston 64 compresses the first and second pluralities of clutch plates 61 and 62 together into frictional engagement. As a result, the clutch gear 63 is connected to the output gear assembly 50 so as to provide a rotatable driving connection therebetween. In this condition, the output shaft 54 is rotatably driven by the output gear assembly 50.

As discussed above, the toothed gear member 51 and the bell member 52 of the output gear assembly 50 are formed from two separate pieces of material. Such a structure provides several advantages over the prior unitary output gear 20. First, as discussed above, traditional output bell gears 20 are relatively complex in structure and, therefore, have been found to be relatively difficult and expensive to manufacture. It has been found to be less difficult and expensive to form the toothed gear member 51 and the bell member 52 of the output gear assembly 50 from two separate pieces of material. Second, the two-piece structure of the output gear assembly 50 of this invention facilitates the customization of the power take-off unit 30 to provide differing overall speed reduction gear ratios between the input gear and the output shaft. Specifically, a plurality of toothed gear members 51 of varying size can be used with a single bell member 52 to provide such differing gear ratios. It has been found to be less costly and inefficient to provide a large number of differently sized toothed gear members 51 for use with a single bell member 52 than to provide a large number of differently sized output bell gears 20, as mentioned above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power take-off unit adapted to connect a source of rotational energy to a driven accessory comprising:

a hollow housing;

an input gear supported within said housing and adapted to be rotatably driven by the source of rotational energy;

an output shaft supported within said housing and adapted to be connected to rotatably drive the driven accessory; and an output gear assembly connected between said input gear and said output shaft, said output gear assembly including a gear member that is rotatably driven by said input gear and a bell member that rotatably drives said output shaft, said gear member and said bell member being formed from separate pieces of material having respective portions formed thereon that engage one another such that said gear member and said bell member are connected together for rotational movement as a unit.

2. The power take-off unit defined in claim 1 wherein input gear includes a first toothed gear portion that is adapted to be rotatably driven by the source of rotational energy and a second toothed gear portion that is engaged by said gear member of said output gear assembly.

3. The power take-off unit defined in claim 1 further including a clutch assembly for selectively connecting said input gear to drive said output shaft, said bell member of said output gear assembly being connected through said clutch assembly to said output shaft.

4. The power take-off unit defined in claim 1 wherein said gear member and said bell member of said output gear assembly include respective splined portions that cooperate so as to connect said gear member and said bell member for rotational movement as a unit.

5. The power take-off unit defined in claim 4 wherein said gear member includes a male splined portion and said bell member includes a female splined portion.

6. The power take-off unit defined in claim 1 wherein said bell member includes a hollow cylindrical portion.

7. The power take-off unit defined in claim 6 wherein said hollow cylindrical portion of said bell member has a plurality of slots formed therein.

8. The power take-off unit defined in claim 7 further including a clutch assembly for selectively connecting said input gear to drive said output shaft, said bell member of said output gear assembly being connected by said slots formed in said hollow cylindrical portion of said bell member to said clutch assembly.

* * * * *

(12) EX PARTE REEXAMINATION CERTIFICATE (9271st)
United States Patent
Rang et al.

(10) Number: US 6,260,682 C1
(45) Certificate Issued: Sep. 4, 2012

(54) POWER TAKE-OFF UNIT HAVING TWO-PIECE OUTPUT GEAR ASSEMBLY

(75) Inventors: Brian L. Rang, Olive Branch, MS (US); Kudlip Raina, Collierville, TN (US)

(73) Assignee: Parker Intangibles LLC, Cleveland, OH (US)

Reexamination Request:
No. 90/009,861, Feb. 18, 2011

Reexamination Certificate for:
Patent No.: 6,260,682
Issued: Jul. 17, 2001
Appl. No.: 09/450,410
Filed: Nov. 29, 1999

(51) Int. Cl.
*B60K 17/28* (2006.01)
*B60K 17/00* (2006.01)
*F16D 13/52* (2006.01)
*F16H 37/00* (2006.01)
*F16H 15/17* (2006.01)

(52) U.S. Cl. .................. 192/70.19; 74/15.86; 74/431
(58) Field of Classification Search ................ None
See application file for complete search history.

(56) References Cited

To view the complete listing of prior art documents cited during the proceeding for Reexamination Control Number 90/009,861, please refer to the USPTO's public Patent Application Information Retrieval (PAIR) system under the Display References tab.

*Primary Examiner* — Peter C. English (57) ABSTRACT

A power take-off unit includes a rigid housing having an input gear rotatably supported therein. An output gear assembly is rotatably supported within the housing. The output gear assembly includes a toothed gear member and a bell member that are splined together. The toothed gear member meshes with the input gear such that it and the bell member are rotatably driven thereby. The bell member is selectively connected through the clutch assembly to an output shaft that is rotatably supported on the power take-off housing. The output shaft extends outwardly from the housing of the power take-off unit and is adapted to be connected to a rotatably driven accessory. The two-piece structure of the output gear assembly minimizes the cost and expense of manufacture and inventory and is more readily adaptable for varying the overall speed reduction gear ratio of the power take-off unit as desired.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-8 are cancelled.

New claim 9 is added and determined to be patentable.

*9. The power take-off unit defined in claim 4 wherein the respective splined portions of the gear member and the bell member have substantially the same axial lengths.*

\* \* \* \* \*